2 Sheets--Sheet 2.
L. W. BOYNTON.
Lathe for Turning Spools.
No. 133,403.  Patented Nov. 26, 1872.
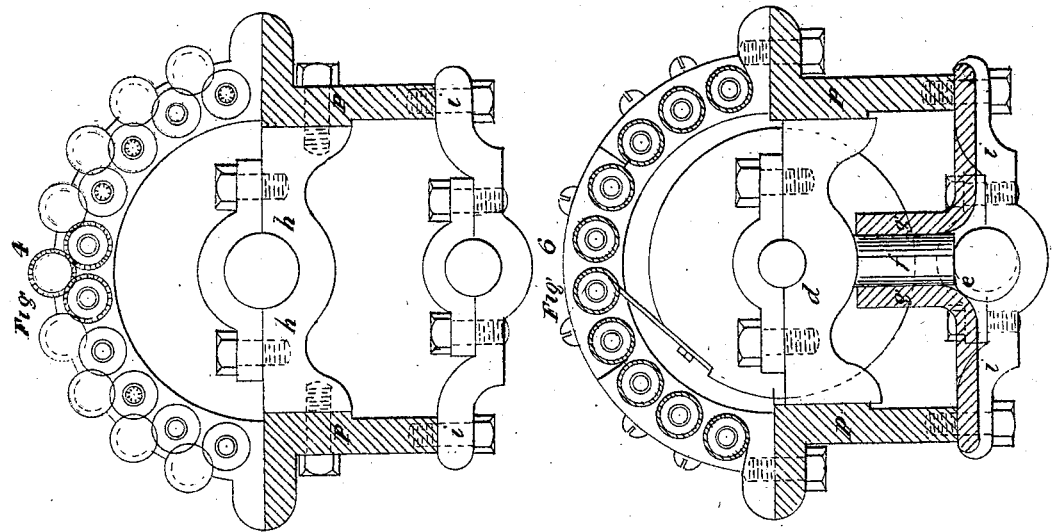
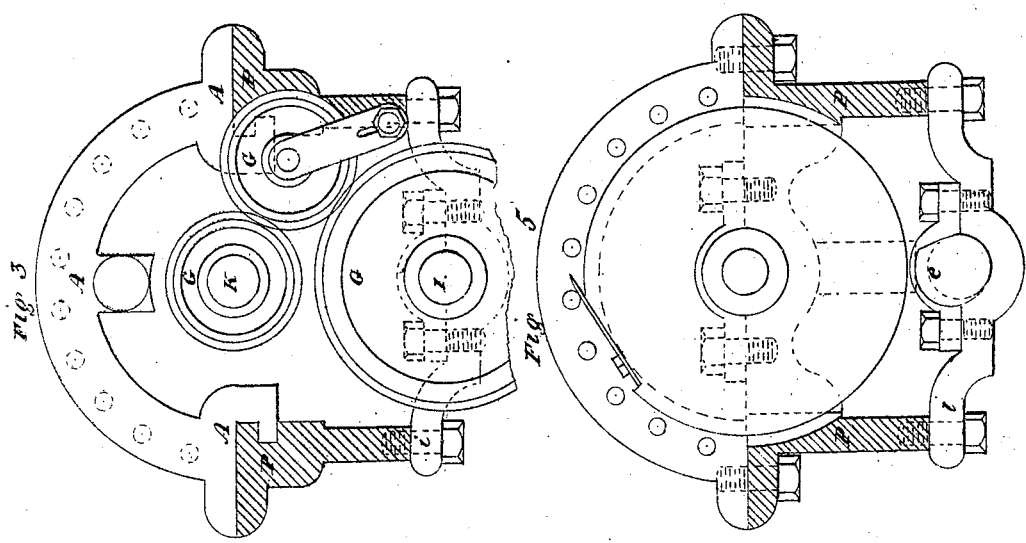
AM. PHOTO-LITHOGRAPHIC CO. N.Y. (OSBORNE'S PROCESS.)

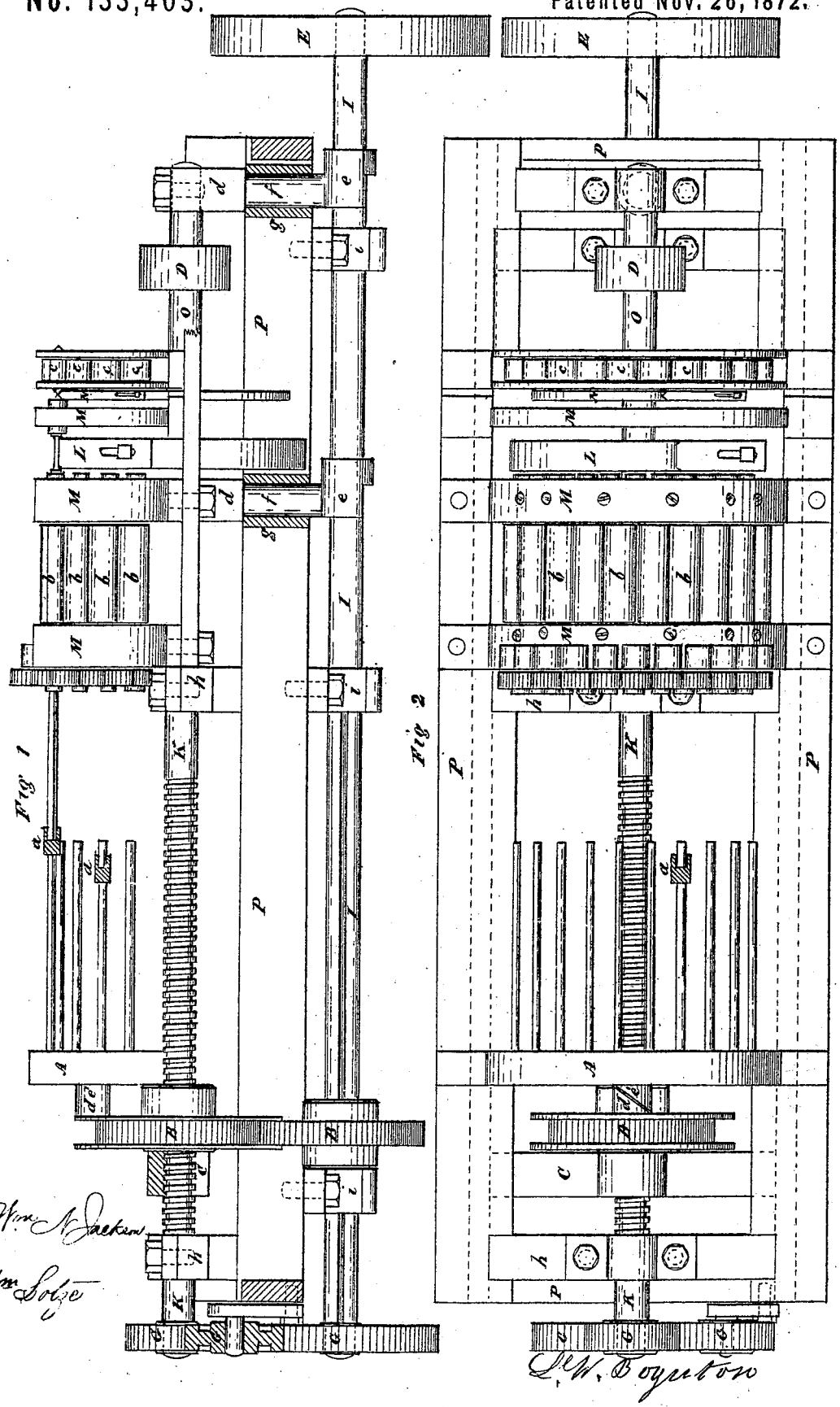

UNITED STATES PATENT OFFICE.

LEANDER W. BOYNTON, OF HARTFORD, CONNECTICUT.

IMPROVEMENT IN LATHES FOR TURNING SPOOLS.

Specification forming part of Letters Patent No. 133,403, dated November 26, 1872.

*To all whom it may concern:*

Be it known that I, LEANDER W. BOYNTON, of the city of Hartford, in the State of Connecticut, have invented a new and useful Improvement in Lathe for Turning Spools, of which the following is a specification:

Figure 1 is a side view of the machine ready for use. Fig. 2 is a plan view of the same. Fig. 3 is a section of parts of the frame, showing the traveling arc and the driving-gears. Fig. 4 is a section of part of the frame, showing the fixed arc with the tubes and the fixed bearings for the upper and lower shafts. Fig. 5 is a section, showing the cutter at its highest position when turning and cutting off. Fig. 6 is a section, showing the cutter at its lowest position, and the sliding bearing and cross-stay.

My improvement consists in making a machine with one or a series of tubes or hollow journals revolving in fixed bearings, these tubes being driven by a belt or gears from the under or driving shaft. The shaft having the cutters upon it, being driven by an independent belt, is made to rise and fall at the proper time by cams upon the driving-shaft, situated centrally below; the cams upon said under or driving shaft acting upon points attached to the bearings of the shaft or cutter-bar; this lower or driving shaft being driven by a belt in the usual way, and, by means of a gear upon its opposite end, driving another shaft having a screw cut upon it, this screw being made to carry forward a cross-bar having a corresponding thread upon it; this cross-bar acting against the hub of a geared wheel made to slide over the screw, and having flanges outside to embrace and carry forward with it the geared wheel on the lower or driving shaft with which it is geared and driven; the upper geared wheel having upon its inner flange a cam so arranged as to strike a similar cam attached to the traveling arc, and driving the arc forward at each revolution a sufficient distance, and carrying the sticks through the tubes at the proper intervals toward the cutters. My improvement further consists in having the gears on the end of either shaft changeable, as shown on Figs. 1, 2, and 3 at G G G, so as to increase or diminish, at pleasure, the distance traveled by the traveling arc, and give the required length for the pieces to be turned. My improvement also consists in having rods fixed in the traveling arc, and in placing over these rods adjustable thimbles in which the ends of the sticks are placed for the purpose of retaining the sticks in position while they are being driven through the tubes, as shown at *a a a*, Figs. 1 and 2.

The full operation of the machine is thus described: I place the traveling arc, which is made to slide in a groove cut in the frame, as shown at A A A A in Figs. 1, 2, and 3, in its starting point near the end, placing with it the traveling gears B B B, Figs. 1 and 2, and cross-bar C C, Figs. 1 and 2, which is made to slide in the same groove as the traveling arc. I then place the sticks to be turned in or through the tubes *b b*, these tubes having small points projecting inward to hold the sticks firmly and cause them to revolve with the tubes. I then set the machine in motion by the belts on the pulleys D D and E E, Figs. 1 and 2, the tubes *b b b b* and *c c c c*, Figs. 1 and 2, being also driven by other belts or gears on the lower shaft I, putting in motion the gears at the opposite end of the machine G G G, Figs. 1, 2, and 3, and the traveling gears B B B, Figs. 1 and 2; the upper shaft K, having a thread cut upon it, and the cross-bar C having a corresponding thread cut in it, are driven forward, propelling the traveling gears B B, the upper gear having flanges on its sides embracing the lower gear; this gear has then a traveling and revolving motion, the lower gear also revolving and sliding upon the shaft I by means of a slot cut in the shaft. On the inner flange of the upper traveling gear I place a cam, *d*, Figs. 1 and 2, which in its revolution strikes a cam or pin, *e' e'*, attached to the traveling arc A A, as shown in Figs. 1 and 2, and driving the arc A A and the sticks forward the required length for the piece to be cut by the cutter L L, Figs. 1 and 2, and so on through another fixed arc, M, until it reaches the cutter N, which is so adapted as to cut off the pieces in the required length and form. During this operation the turned pieces are held and made to revolve in smaller tubes *c c c c*, Figs. 1 and 2, and driven in a similar way as are the longer tubes *b b b b*. The cutters L and N are fixed upon an independent shaft, O, driven by the pulley D D, Figs. 1 and 2, this shaft O, with the cutters, being made to rise and fall through sliding bearings $d\ d\ d$, Figs. 1 and 6, acted upon by cams $e\ e\ e\ e$, Figs. 1, 5, and 6, these bearings having points or rods attached to the under side $f\ f\ f$, Figs. 1 and 6, and the rods, when used, being kept in position by cross-stays, with upright tubes through which they slide, and are acted upon by the cams $e\ e$ on the lower shaft, as shown at $g\ g\ g$, Figs. 1 and 6. The cutter-shaft, with cutters, is so arranged as to rise sufficiently to turn and cut off the pieces, and then to drop out of the way until another portion of the stick is driven to its position by the traveling arc A A, and thus continues until the sticks are used, when new sticks are replaced, as before explained. Thus one revolution of lower or driving shaft causes the cutters to rise and turn, cut off as many pieces as there are sticks in the tubes, and at the same revolution to press the sticks forward any length required for the next pieces to be turned. The shaft K with the screw cut on it is suported by bearings fixed to the upper part of the frame, as shown at $h\ h\ h\ h$, Figs. 1, 2, and 4. The lower or driving shaft I is supported by bearings fixed to the under side of the frame, as shown at $i\ i\ i\ i$, Figs. 1, 3, 4, 5, and 6.

I make the frame of cast-iron or other suitable material, and in the form substantially as shown at P P P P, Figs. 1, 2, 3, 4, 5, and 6. I make the arcs of cast-iron or other suitable material, and in the form substantially as shown at A A A A and M M M M, Figs. 1, 2, and 3.

Claims.

1. In combination with the series of revolving tubes $b\ b$, arranged as shown, the revolving cutter L, which is raised during operation by means of the cam $e$, substantially for the purpose set forth.

2. In combination with the series of revolving tubes $b\ b$ and the corresponding series of tubes $c\ c$, arranged as shown, the cutter L and the pointing-cutter N.

3. In combination with the series of revolving tubes $b\ b$ and revolving cutter L, the traveling arc A, sliding and fixed gears B B and G G, and shafts I K, substantially as set forth.

4. In combination with the screw-shaft K and feathered shaft I, the sliding gears B B, (one of which is provided with cam $d$,) the removable half nut C, and changeable gears G G, to produce the revolving and traveling movements of gears B B, for the purpose substantially as described.

LEANDER W. BOYNTON.

Witnesses:
  WM. N. JACKSON,
  WILLIAM LOTZE.